United States Patent [19]

Ohkawa et al.

[11] Patent Number: 4,750,105
[45] Date of Patent: Jun. 7, 1988

[54] AUTOMATIC PROGRAMMING SYSTEM INCLUDING MACHINING ACCURACY OPTIMIZATION

[75] Inventors: Shoji Ohkawa, Ohbu, Japan; Shigeru Doi, Boulogne Billancourt, France

[73] Assignee: Toyoda Koki Kabushiki Kaisha, Kariya, Japan

[21] Appl. No.: 893,726

[22] Filed: Aug. 6, 1986

[30] Foreign Application Priority Data

Sep. 4, 1985 [JP] Japan .................. 60-195558

[51] Int. Cl.$^4$ .................................. G06F 15/46
[52] U.S. Cl. ............................ 364/191; 364/474
[58] Field of Search ............... 364/171, 191, 192, 193, 364/182, 474, 475

[56] References Cited

U.S. PATENT DOCUMENTS

| | | | |
|---|---|---|---|
| 4,393,449 | 7/1983 | Takeda et al. | 364/171 |
| 4,445,182 | 4/1984 | Morita et al. | 364/474 |
| 4,498,259 | 2/1985 | Yamamoto et al. | 364/474 |
| 4,513,366 | 4/1985 | Munekata et al. | 364/474 |
| 4,521,860 | 6/1985 | Kanematsu et al. | 364/191 |
| 4,530,046 | 7/1985 | Munekata et al. | 364/474 |
| 4,584,649 | 4/1986 | Komanduri et al. | 364/191 |

OTHER PUBLICATIONS

V.D.I. Zeitschrift, vol. 127, No. 8, Apr. 1985, pp. 279–284, Dusseldorf, DE; R. Baisch: "Entwicklungsstand und Ausblick Bei Numerischen Steuerungen (CNC) fur Werkzuegmaschinen".

A. Schone: "Prozessrechensysteme", pp. 139–142, 389–397, Carl Hanser Verlag, Munich, DE p. 139, paragraph 3.2.2; p. 390, item 3; pp. 393–395, paragraph 8.2.2.

*Primary Examiner*—Jerry Smith
*Assistant Examiner*—Allen MacDonald
*Attorney, Agent, or Firm*—Oblon, Fisher, Spivak, McClelland & Maier

[57] ABSTRACT

An automatic programming system is incorporated in a numerical controller which controls the operation of a machine tool connected thereto in accordance with a numerical control program. The programming system is designed to automatically program the numerical control program based upon machining information which is manually input by means of a data input device in an interactive mode for defining machinings to be effected on a workpiece. The programming apparatus includes means for automatically determining the machining order of a plurality of machinings on a workpiece in such a manner that any machining needing a higher accuracy is carried out later than any other machining needing a lower accuracy.

4 Claims, 12 Drawing Sheets

FIG. 8(g)
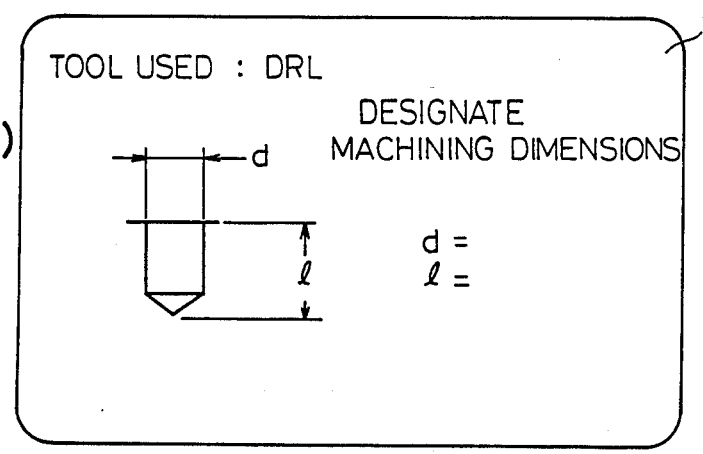
FIG. 8(h)
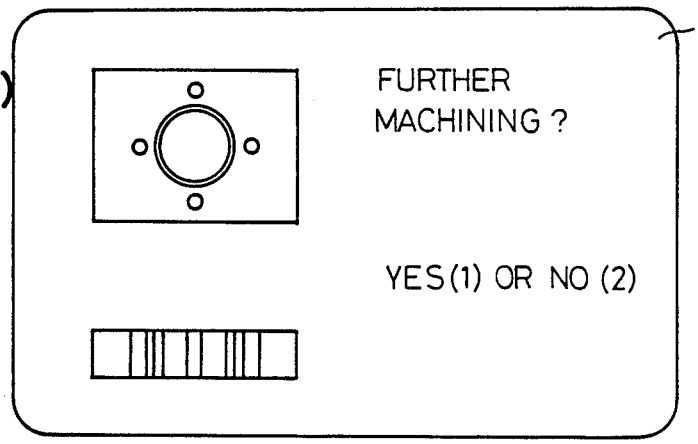
FIG. 9
DDT
| NO. | KIND OF MACHIN-ING | d | ℓ | s | c | POSITION | ACCU-RACY |
|---|---|---|---|---|---|---|---|
| 1 | BO1 | 50.0 | 20.0 | 7.0 | 5.0 | P0(X0,Y0) | 3 |
| 2 | DRL | 8.0 | 25.0 |  | 3.0 | P1(X1,Y1)<br>P2(X2,Y2)<br>P3(X3,Y3)<br>P4(X4,Y4) | — |

FIG.10(a)

MDT

| NO | KIND OF MACHINING | d | ℓ | s | c | ABSOLUTE POSITION | ACCURACY | MACHINING ORDER |
|---|---|---|---|---|---|---|---|---|
| 1 | BO1R | 44.0 | 20.0 | 7.0 | 5.0 | X0', Y0' | − | 1 |
| 2 | BO1F | 50.0 | 20.0 | 7.0 | 5.0 | X0', Y0' | 3 | 6 |
| 3 | DRL | 8.0 | 25.0 | − | 3.0 | X2', Y2' | − | 2 |
| 4 | DRL | 8.0 | 25.0 | − | 3.0 | X3', Y3' | − | 3 |
| 5 | DRL | 8.0 | 25.0 | − | 3.0 | X4', Y4' | − | 4 |
| 6 | DRL | 8.0 | 25.0 | − | 3.0 | X5', Y5' | − | 5 |

FIG.10(b)

MDT

| NO | KIND OF MACHINING | d | ℓ | s | c | ABSOLUTE POSITION | ACCURACY | MACHINING ORDER |
|---|---|---|---|---|---|---|---|---|
| 1 | BO1R | 49.0 | 20.0 | 7.0 | 5.0 | X0', Y0' | − | 1 |
| 2 | DRL | 8.0 | 25.0 | − | 3.0 | X2', Y2' | − | 2 |
| 3 | DRL | 8.0 | 25.0 | − | 3.0 | X3', Y3' | − | 3 |
| 4 | DRL | 8.0 | 25.0 | − | 3.0 | X4', Y4' | − | 4 |
| 5 | DRL | 8.0 | 25.0 | − | 3.0 | X5', Y5' | − | 5 |
| 6 | BO1F | 50.0 | 20.0 | 7.0 | 5.0 | X0', Y0' | 3 | 6 |

AUTOMATIC PROGRAMMING SYSTEM INCLUDING MACHINING ACCURACY OPTIMIZATION

BACKGROUND OF THE INVENTION

1. Field of the Invention

The present invention relates to a system for automatically preparing a numerical control program which is used to control a cutting machine tool with, preferably, an automatic tool changer. More particularly, it relates to such a system capable of automatically preparing a numerical control program used in machining a workpiece, based upon machining information on a plurality of portions of the workpiece.

2. Discussion of the Prior Art

Known numerical controllers for cutting machine tools such as machining center are provided with an automatic programming function. In such an automatic programming function, a numerical control program used in successively machining a plurality of portions on a workpiece is automatically prepared based upon machining information which is input to define a machining position and a machining shape for each of the workpiece portions.

One type of the known numerical controllers is designed to automatically determine the machining order of the workpiece portions in such a manner as to follow the order in which machining information for the workpiece portions are input. Another type of the known numerical controllers is designed to automatically determine the machining order of the workpiece portions in such a manner as to make the number of tool change operations minimum.

However, in these known numerical controllers, the machining order is determined without taking into consideration a machining accuracy required for each workpiece portion. Thus, in the case that drillings have to be performed at respective positions P1-P4 close to a bore Ha needing a high precision boring, as shown in FIGS. 12(a) and 12(b), a numerical control program prepared automatically by the known controllers would instruct that a finish or fine boring for the bore Ha be performed in advance of the drillings at the positions P1-P4. This gives rise to a problem that the finish accuracy of the bore Ha is deteriorated as a result of being subjected to stress and/or being damaged or scratched with chips during drilling operations of the holes Hb-He.

SUMMARY OF THE INVENTION

It is therefore an object of the present invention to provide an automatic programming system capable of automatically determining the machining order of workpiece portions in such a manner as to machine any workpiece portion needing a higher machining accuracy, later than any other workpiece portion needing a lower machining accuracy.

According to the present invention, there is provided an automatic programming system for automatically preparing a numerical control program which is used in successively machining a plurality of portions on a workpiece. In the programming system, accuracy data instructing that at least one of the workpiece portions be machined at a higher accuracy than any other workpiece portion is input by data input means in addition to other machining information and is stored in a data storage device. Order determination means makes reference to the accuracy data stored in the data storage device so as to determine the machining order of the workpiece portions in such a manner as to machine any workpiece portion which requires a higher machining accuracy, later than any other workpiece portion needing a lower machining accuracy. Program preparation means prepares a numerical control program which enables the workpiece portions to be successively machined in the machining order determined by the order determination means, based upon the machining information stored in the data storage device and by reference to the machining order determined by the order determination means.

With this configuration, the order determination means is operable to automatically determine the machining order of the workpiece portions so that any workpiece portion needing a higher machining accuracy is machined later than any other portion needing a lower accuracy. Thus, when the workpiece is machined in accordance with the numerical control program prepared by the programming system according to the present invention, any workpiece portion needing a higher accuracy can be precisely machined without being affected by the machinings on other workpiece portions which require lower machining accuracies.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, wherein like reference numerals designate identical or corresponding parts throughout the several views, and in which.

Figure 1:
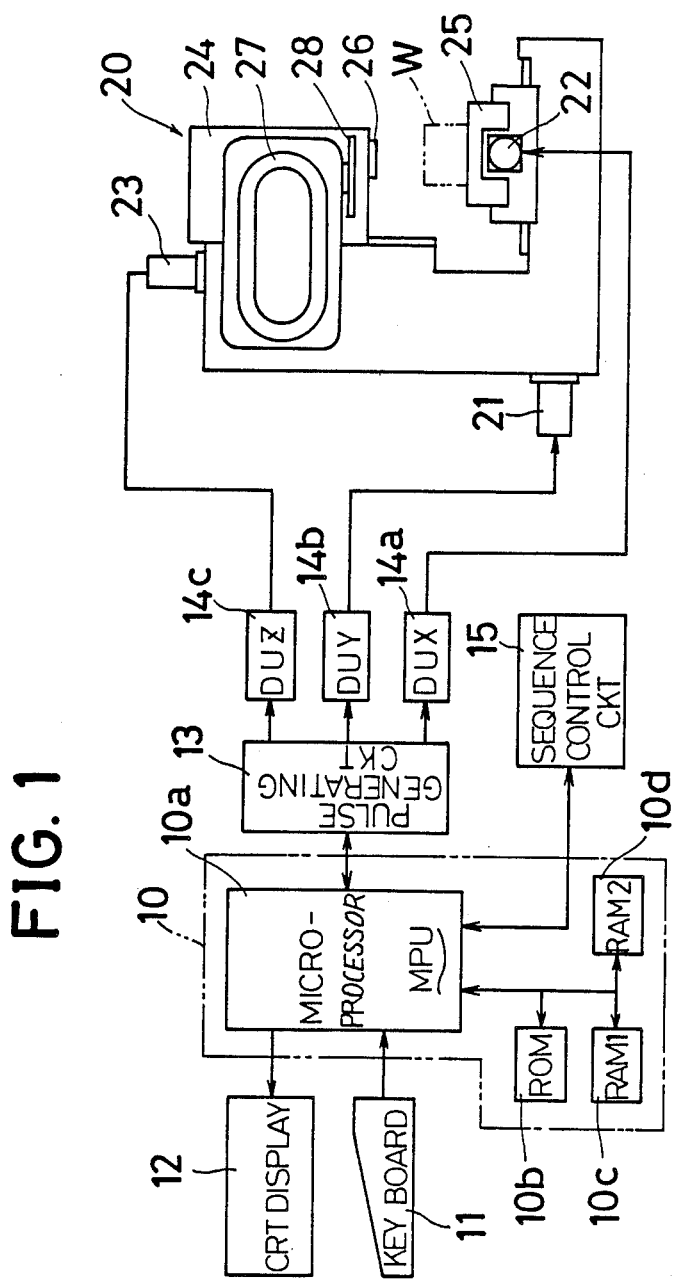
FIG. 1 is a general block diagram of a numerical controller which incorporates therein an automatic programming system according to the present invention, also showing a schematic elevational view of a machine tool controllable by the numerical controller.
Figure 8A:
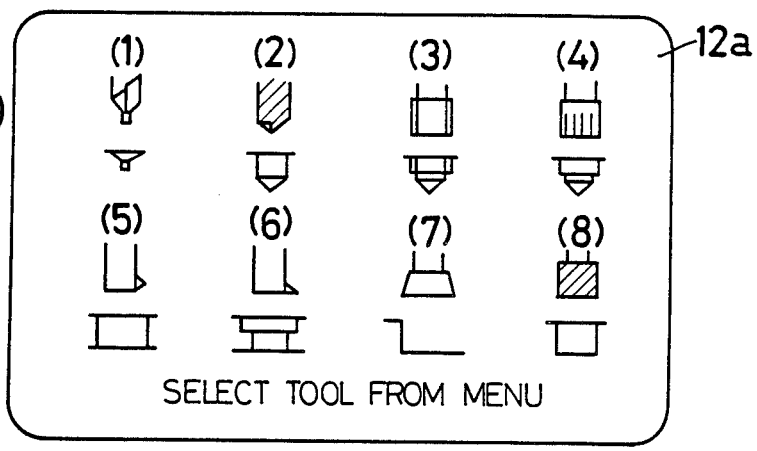
Figure 8B:
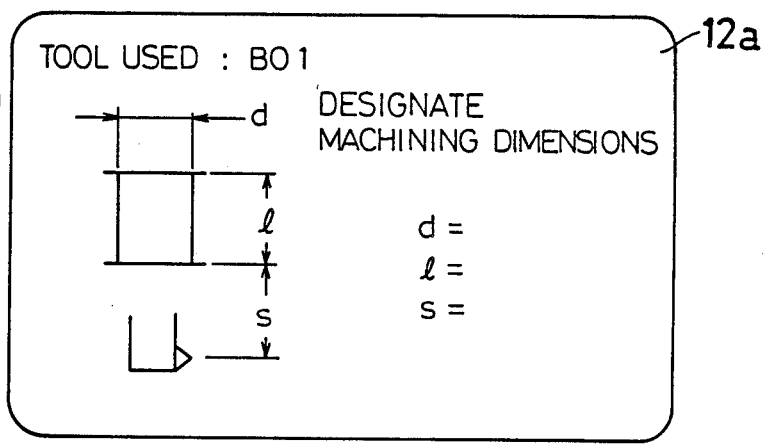
Figure 8C:
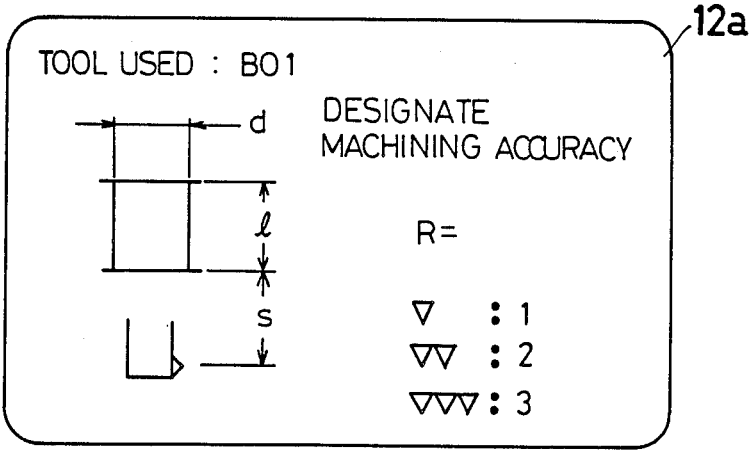
Figure 12A:
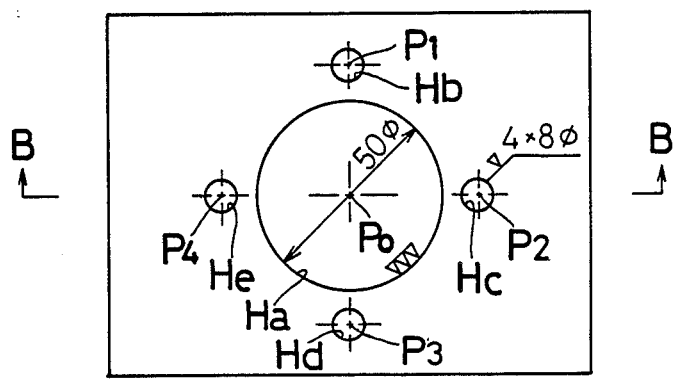
Figure 12B:
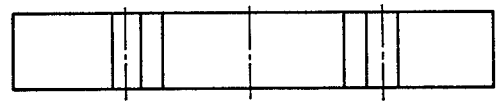
Figure 13:
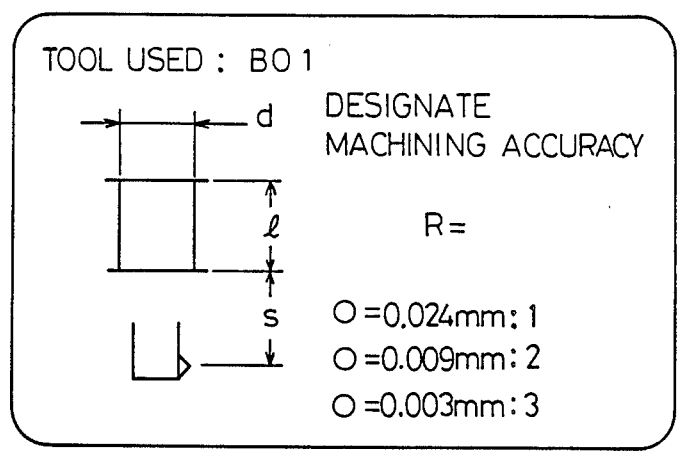
Figure 14A:
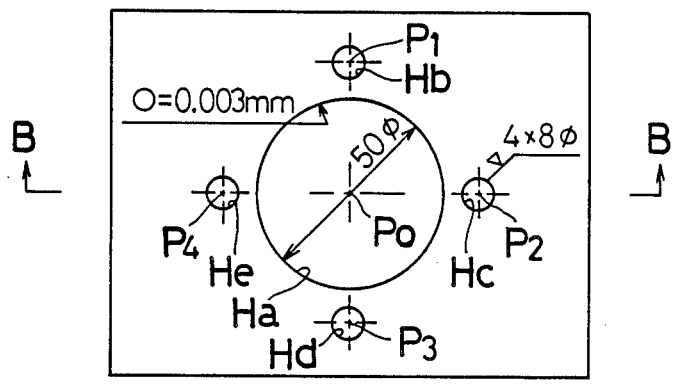
Figure 14B:
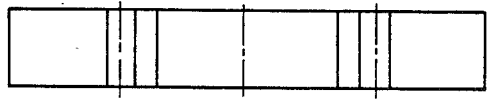

FIGS. 8(a)-8(h) are explanatory views showing images which are selectively generated on a screen of a CRT display device 12 shown in FIG. 1 when the machining definition routine is executed;

FIG. 9 is an explanatory view showing a definition data table DDT formed in a random access memory 10c shown in FIG. 1;

FIGS. 10(a) and 10(b) are explanatory views showing at different data storage states a machining data table MDT formed in the random access memory 10c;

Figure 11:
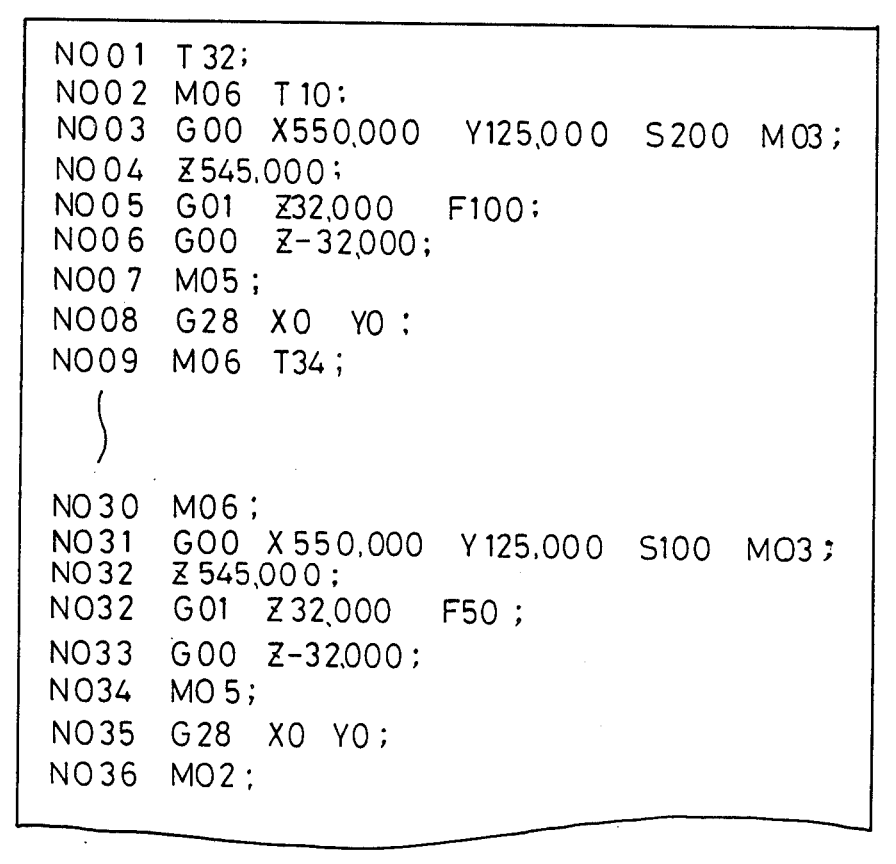

FIG. 11 is an explanatory view showing a numerical control program prepared for use in machining a workpiece shown in FIGS. 12(a) and 12(b);

FIGS. 12(a) and 12(b) are part drawings showing the finished shape of the workpiece;

FIG. 13 is an explanatory view of an image which is generated on the CRT screen in a second embodiment of the present invention and which corresponds to that shown in FIG. 8(c); and FIGS. 14(a) and 14(b) are part drawings used in the second embodiment in place of those shown in FIGS. 12(a) and 12(b).

DETAILED DESCRIPTION OF THE PREFERRED EMBODIMENTS

Referring now to the drawings and particularly to FIG. 1 thereof, a reference numeral 10 denotes a central processing unit constituting a numerical controller which is provided with a function to operate as an automatic programming system. The central processing unit 10 is composed of a microprocessor (hereafter referred to as "MPU") 10a a read-only memory (hereafter as "ROM") 10b, a battery-supported random access memory (hereafter as "RAM1") 10c free from volatility, and another random access memory (hereafter as "RAM2") 10d utilized as a data buffer. The MPU 10a is connected through interfaces, not shown, to a keyboard 11 used as a data input means, to a CRT display unit 12, to a pulse generating circuit 13 for distributing command pulses to servomotor drive circuits 14a-14c, and to a sequence control circuit 15.

Further, a reference numeral 20 denotes a machine tool of the type known as "machining center", controllable by the numerical controller constructed above. As servomotors 21, 22, 23 are respectively driven by the servomotor drive circuits 14a-14c, relative movement between a work table 25 carrying a workpiece W and a spindle head 24 rotatably carrying a vertical tool spindle 26 is altered in three directions each perpendicular to one another. The machining center 20 is provided with a tool magazine 27 for removably storing a plurality of diverse tools and an automatic tool exchanger 28. The tool exchanger 28 exchanges a tool in the tool spindle 26 with one of the tools selectively presented by a magazine indexing device, not shown, to a tool change position within the tool magazine 27, whereby the workpiece W can be machined with the diverse tools selectively received in the tool spindle 26.

Figure 2:
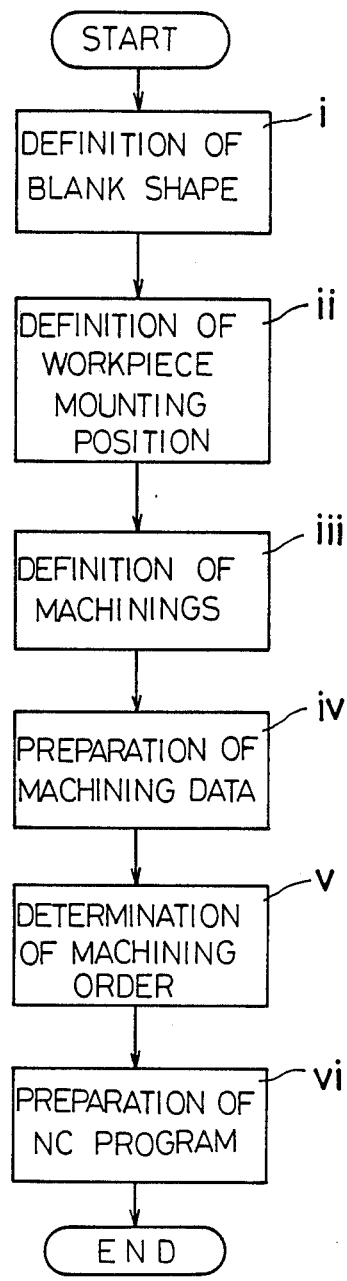
FIG. 2 is a general flow chart of a system control program executed by a microprocessor 10a shown in FIG. 1.

The MPU 10a is operated in accordance with a system control program stored in the ROM 10b to selectively perform an automatic programming function and a numerical control function. The MPU 10a, in the automatic programming function, prepares a numerical control program (hereafter referred to as "NC program") based upon required machining information or data which is input by the keyboard 11 in an interactive mode, and in the numerical control function, controls the machining center 20 (i.e., the servomotors 21, 22 and 23, the magazine indexing device, the tool exchanger 28, a tool spindle drive motor, not shown, and the like) in accordance with the prepared NC program. In this illustrated embodiment, the automatic programming function and the numerical control function are performed by the MPU 10a as follows:

The MPU 10a first executes an automatic programming routine generally shown in FIG. 2 to prepare an NC program for use in machining a workpiece W and to store it in an NC data area of the RAM1 10c. Thereafter, the MPU 10a executes a numerical control routine shown in FIG. 7 to control the operation of the machining center 20 in accordance with the NC program stored in the NC data area in the RAM1 10c.

The MPU 10a, when executing the numerical control routine, reads out block by block the NC data constituting the NC program from the RAM1 10c, and in accordance with each read-out NC data block, enables the pulse generating circuit 13 to distributes feed pulses to any of the servomotor drive circuits 14a-14c and simultaneously, enables the sequence control circuit 15 to perform an auxiliary control operation such as, for example, a magazine indexing operation, a tool exchange operation, a spindle stop or the like. Such numerical control operation of the MPU 10a is the same as those of conventional computerized numerical controllers known as "CNC". Accordingly, further details of the numerical control operation performed by the MPU 10a is omitted herein for the sake of brevity, and the automatic programming function of the MPU 10a will be described hereafter in detail.

As shown in FIG. 2, processings that the MPU 10a executes in the automatic programming function are roughly classified into six steps (i-vi) of defining the shape of an unfinished workpiece W, of defining the mounting position of the workpiece W relative to a machine origin, of defining machinings, of preparing machining data, of automatically determining a machining order, and of preparing an NC program. These six steps (i-vi) are executed in order as follows:

(i) Definition of Workpiece Shape

This step is to define the shape of a blank or workpiece W to be machined on the machining center 20. The detailed processings in this step are fully described in U.S. Pat. No. 4,530,046 owned by the same assignee as the present application, and therefore, such description in that patent is incorporated herein.

Assuming now that the workpiece W has a large bore at its center portion as shown in FIGS. 12(a) and 12(b), the blank shape of the workpiece W can be defined by taking a rectangular parallelepiped as a basic blank shape and by combining the rectangular parallelepiped with a round hole as an additional blank shape. Upon completion of this definition, step (ii) is reached for defining a workpiece mounting position.

(ii) Definition of Workpiece Mounting Position

Processings for this step is described also in the above-noted U.S. patent, and therefore, the corresponding description in the patent for this step is also incorporated herein. In this step, the difference between a reference point of the workpiece W and a table reference position is input as mounting position data.

(iii) Definition of Machinings

Figure 3:
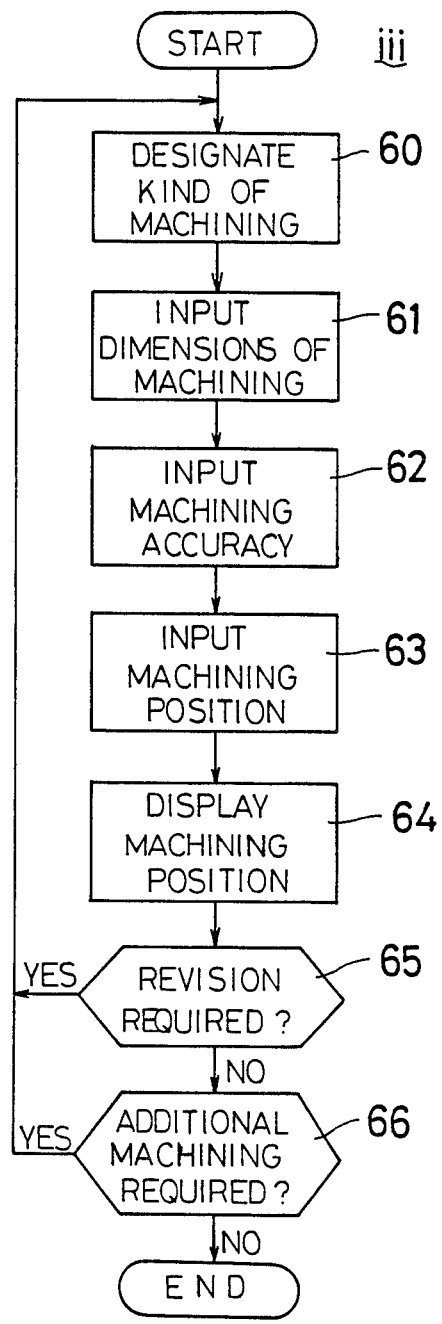
FIG. 3 is a specific flow chart of a machining definition routine which the microprocessor 10a executes in step (iii) of FIG. 2.

After definitions of a workpiece mounting position in the above-described manner, the MPU 10a in step 60 of FIG. 3 displays on a screen 12a of the CRT display unit 12 a menu of tools used in the machine tool 20. This can be done by displaying on the CRT screen 12a general images of a centering tool, a drilling tool, a tapping tool, a boring tool and the like along with a message "SELECT TOOL FROM MENU", as shown in FIG. 8(a).

Assuming now that in the machining of the workpiece W shown in FIGS. 12(a) and 12(b), a first definition is to be made for the boring of a large diameter bore Ha formed at the center of the workpiece W, the operator inputs a numeral "5" by depressing a 5-imprinted numeric key corresponding to data "(5)" over a boring tool image on the CRT screen 12a. The MPU 10a thus recognizes that the machining required first is a boring. Step 61 is next executed, wherein a general image of a boring tool is displayed on the CRT screen 12a, along with a message instructing that the operator input data indicative of a diameter (d) and a depth (l) of the bore Ha and an allowable thrusting-through length (s) of the boring tool.

When data indicative of the diameter (d) and depth (l) of the bore Ha and the thrusting-through length (s) of the boring tool is input in response to the message, the MPU 10a then executes step 62, wherein a processing is executed to display as shown in FIG. 8(c) a comment instructing that information for machining accuracy be input using any one of numerals 1-3. The operator inputs machining accuracy data in response thereto. In a first embodiment of the present invention, the machining accuracy data is represented by the number of finish marks of surface roughness. Upon completion of data input for a machining shape, the CPU 10a then displays on the CRT screen 12a a general image illustrating the relative positions (x, y) in the X and Y-axis directions between the center of the bore Ha and a reference point (e.g., a corner of the workpiece W in the embodiment) of the workpiece W, along with another general image illustrating an air-cut feed amount (c) from an upper surface of the workpiece W. The CRT screen image at this time also includes a message directing the operator to input the necessary data (x, y and c).

In response to the message, the operator successively inputs the center position of the bore Ha on the workpiece W by reference to the part drawings and further inputs the air cut feed amount (c). The MPU 10a then moves from step 63 to step 64, wherein the figure of the bore Ha is displayed based upon the input bore position data in such a manner as to be superposed on the workpiece blank shape, as shown in FIG. 8(e).

When the blank shape with the bore Ha is displayed in the above-described manner, a message questioning the operator about the necessity of modification is simultaneously displayed at the right half of the CRT screen 12a. Such modification being necessary, the operator inputs a 1-imprinted numeric key, which causes the return of the routine from step 65 to step 60, whereby the MPU 10a successively executes the steps 60-64 again. Such modification being unnecessary, on the other hand, the operator inputs a 2-imprinted numeric key to display at the right half of the CRT screen 12a a message which questions the operator as to whether a further machining is required on the workpiece W, as shown in FIG. 8(f).

According to the part drawings shown in FIGS. 12(a) and 12(b), four drilling holes Hb-He have to be made at an equiangular interval close to an internal surface of the bore Ha formed at the center of the workpiece W. In this particular instance, the operator therefore inputs the 1-imprinted numeric key, in response to which the MPU 10a then returns its routine from step 66 to step 60 to execute the series of steps 60-65 again.

Since drilling information is to be defined in this particular instance, an image shown in FIG. 8(a) is displayed on the CRT screen 12a at step 60, and the operator depresses the 2-imprinted numeric key in response thereto. Thus, step 61 is then executed to display an image shown in FIG. 8(g), along with a message instructing that a diameter (d) and a depth (l) in a drilling be input, and the operator input these data in response to the message.

Figure 8D:
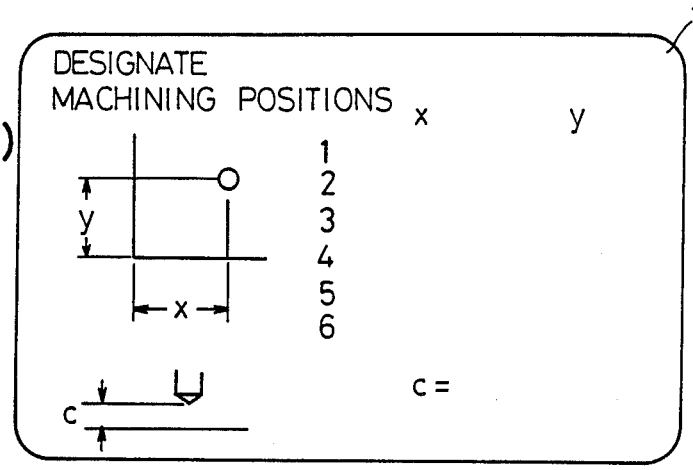
Figure 8E:
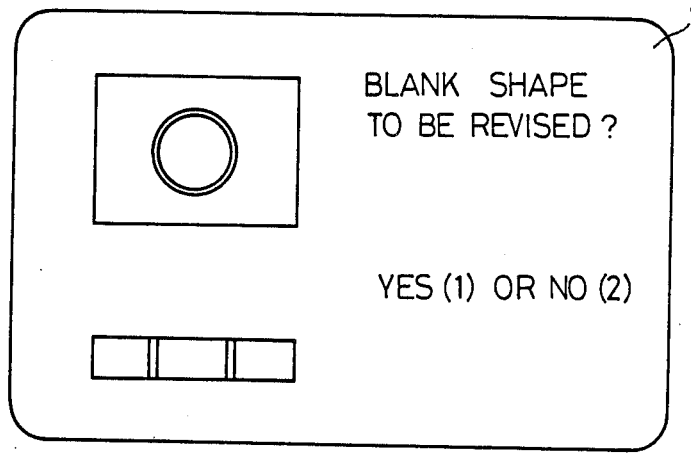
Figure 8F:
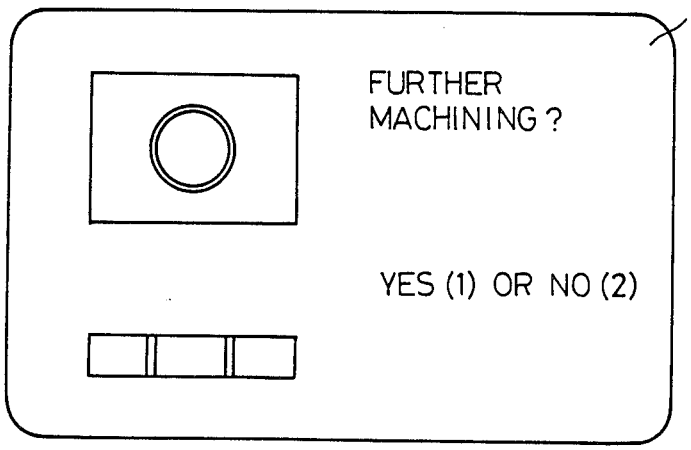

In steps 62-65, the same processings as described above are performed, wherein positions of the four drilling holes Hb-He are designated using the image shown in FIG. 8(d) and wherein in step 63, the newly defined drilling holes Hb-He are displayed along with the previously defined bore Ha in such a manner as to be superposed on the blank shape. It is to be noted that no information on machining accuracy is input for drillings.

The data input in the above-described machining definition step (iii) are in turn stored as definition data in a definition data table DDT shown in FIG. 9. The definition of machinings are completed in this manner, and when "2" is input with an image shown in FIG. 8(h) being displayed, the MPU 10a moves its routine to a machining data preparation step (iv).

(iv) Preparation of Machining Data

Figure 4:
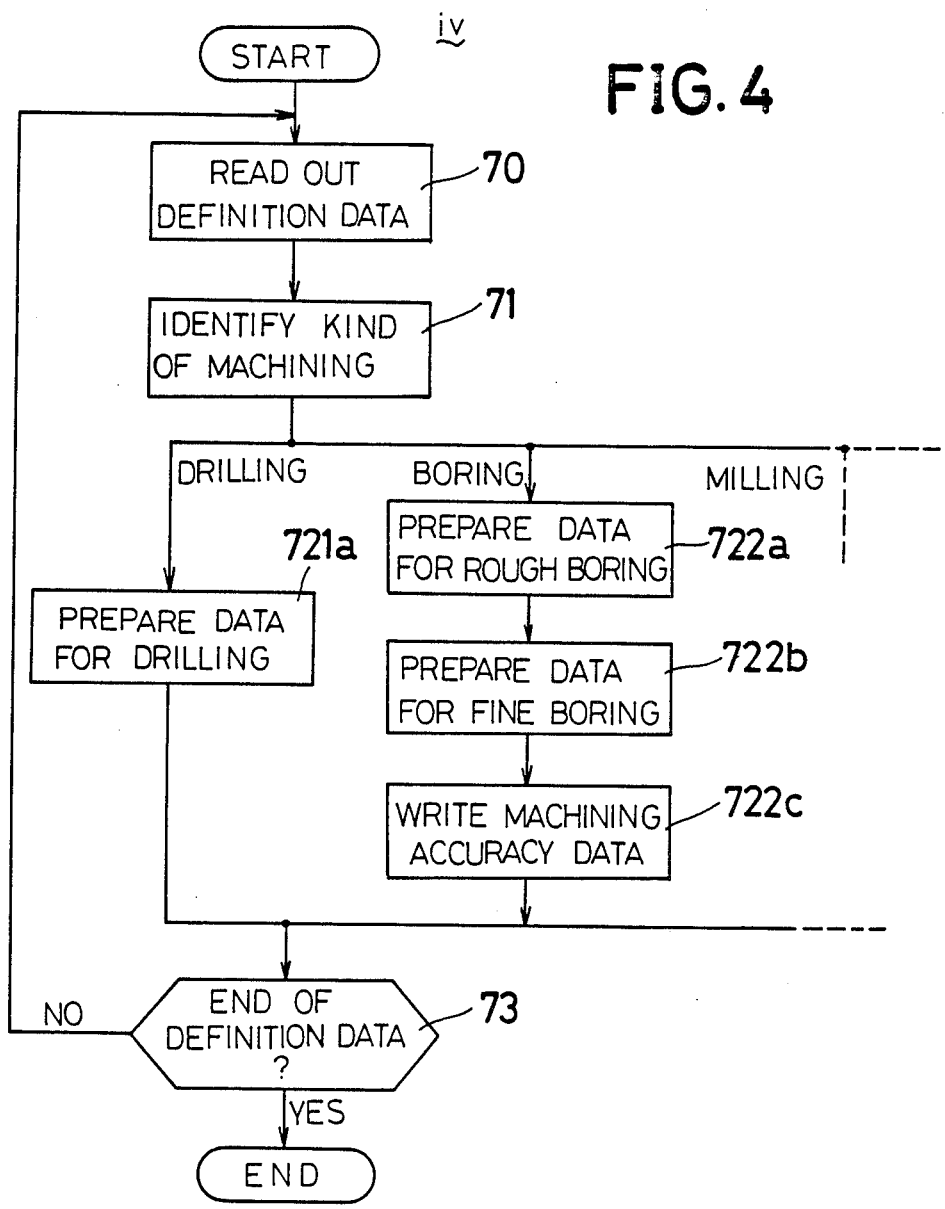
FIG. 4 is a specific flow chart of a machining data preparation routine which the microprocessor 10a executes in step (iv) of FIG. 2.

In the preparation of machining data, the MPU 10a executes a program shown in FIG. 4. First of all, a data group for a machining which was first defined is read out in step 70, and the kind of the machining is ascertained based upon the read-out data group in step 71. In this particular instance, the first defined machining is judged to be a boring through an ascertaining processing in step 71. Thus, step 71 is followed by step 722a and then by step 722b, wherein data for a rough boring and data for a fine boring are prepared based upon the read-out machining definition data. As is clear from comparison of FIG. 10(a) with FIG. 9, each of the rough and fine boring data is prepared by copying the definition data for the boring stored in the definition data table DDT and by partly revising the copied data thereafter. For the rough boring data, such revision is made to suffix "R" to a symbol "BO!" representing the kind of machining and to decrease a bore diameter (d) from "50" to "44" by an allowance for the fine boring. On the other hand, such revision for the fine boring data is made only to suffix "F" to the symbol "BO!". The rough and fine boring data thus prepared are then stored respectively in first and second storage areas of a machining data table MDT, as shown in FIG. 10(a). When step 722c is then reached, the machining accuracy data which was input in the definition of the boring is transferred to the storage area storing the fine boring data.

When the preparation of machining data for the first defined machining is completed in this manner, step 73 is reached to ascertain whether or not, machining data for any further machining has been stored in the definition data table DDT. If "Yes" is answered, return is made to step 70 to read out another data group for one or more machinings which were defined second. In the instance of the exemplified workpiece W, a data group for four drillings is read out in step 71, and the kind of the machinings is judged to be drilling in step 71. Since no rough machining is performed in drillings, machining data which respectively correspond to the drillings at four positions P1-P4 are prepared and stored in turn in the third storage area and those following of the machining data table MDT.

Figure 5:
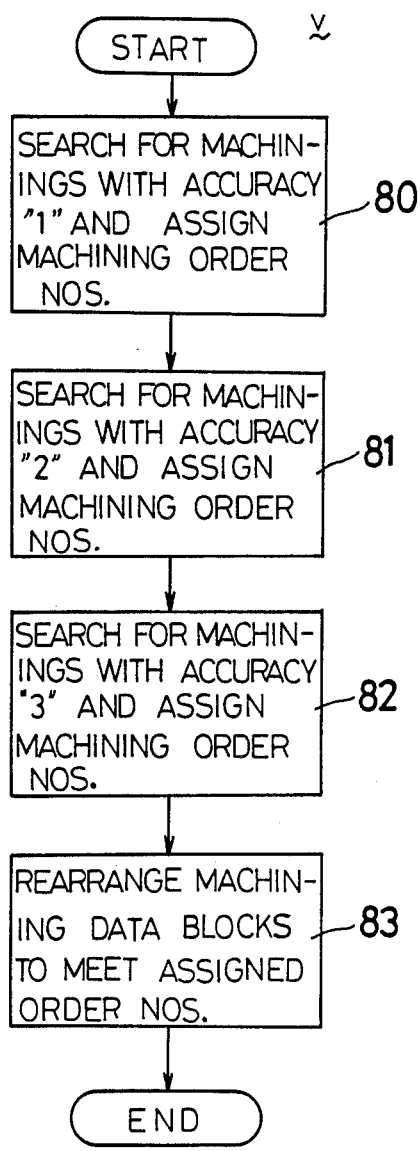
FIG. 5 is a specific flow chart of a machining order determination routine which the microprocessor 10a executes in step (v) of FIG. 2.

When completing the preparation of machining data based upon the definition data, the MPU 10a then executes processings shown in FIG. 5 to determine the machining order as follows:

(v) Determination of Machining Order

The MPU 10a executes step 80, wherein all of the storage areas of the machining data table MDT are successively searched from the first storage area for those each of which stores nothing or "1" at its accuracy storage location and wherein machining order numbers beginning from a numeral "1" are respectively written at order storage locations of those searched. As a result, numerals 1-5 as machining order data are in turn written at the order storage locations of those areas whose accuracy storage locations have not stored any machining accuracy data. Thereafter, the MPU 10a executes step 81, wherein all of the storage areas of the machining data table MDT are successively searched from the first address for those each of which has stored "2" at its accuracy storage location and wherein machining order numbers beginning from the next to the last number of machining order determined in step 80 are in turn written at the order storage locations of those searched. Further, the MPU 10a executes step 82, wherein the same processings as step 81 are executed as to those storage areas each storing "3" at its accuracy storage location, of the machining data table MDT. In the case of the workpiece W as exemplified, because there is no machining data including "2" as the machining accuracy data, "6" is written at the order storage location of the second storage area in which fine boring data for the bore Ha has been stored.

Following the writing of the machining order data, the MPU 10a executes step 83, whereby the data in the machining data table MDT are arranged in the order determined by the assigned machining order data, as shown in FIG. 10(b).

(vi) Preparation of NC program

Figure 6:
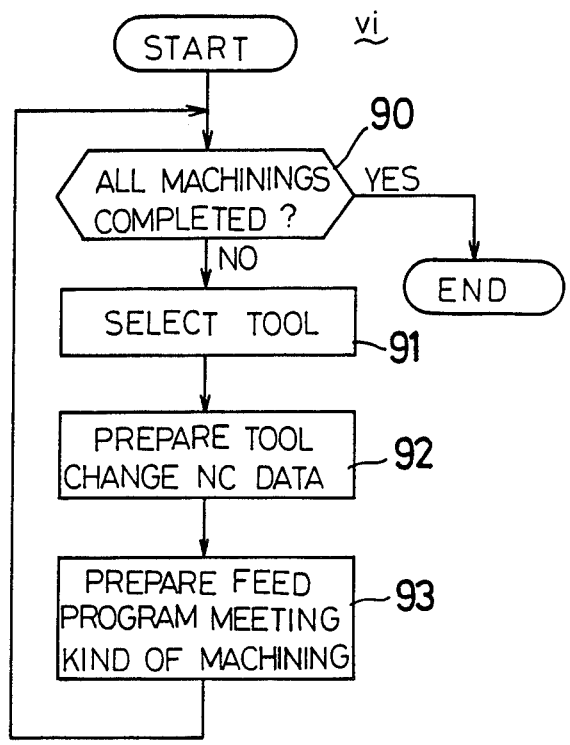
FIG. 6 is a specific flow chart of an NC program preparation routine which the microprocessor 10a executes in step (iv) of FIG. 2.

Upon completion of processings for determining the machining order, the MPU 10a ascertains in step 90 of FIG. 6 whether the preparation of an NC program has been completed up to the final machining step or not. If it is not completed yet, step 90 is followed by step 91, wherein a tool to be used at the first machining step is selected and wherein a tool number assigned to the selected tool is identified. In this tool selection, a tool which meets the kind of a machining in the first step as well as a shape to be made by the machining is selected from those registered in a tool file provided in the RAM1 10c, and the tool number of the selected tool is identified by reference to the tool file. In this step, a tool to be used in the next machining step is also selected, and the tool number assigned to the selected tool is also identified.

The tool selection step 91 is followed by step 92, wherein NC program segments are prepared instructing that the first selected tool be attached to a tool spindle as a tool change is required and that the second selected tool be indexed to the tool change position within the tool magazine 27. It is to be noted that an NC program portion for the first machining step is given data instructing that a tool to be used in the first machining step be indexed to the tool change position. Of those shown in FIG. 11, data blocks indicated by sequence numbers N001 and N002 are of the NC program portion prepared in this step 92.

Step 93 is then reached, wherein the processing of the MPU 10a is directed to one of routines, not shown, corresponding to the kinds of machinings so that an NC program portion which corresponds to the kind of a machining is prepared. In this particular embodiment, since the first machining step is a rough boring, an NC program portion for a boring is prepared. Data blocks with sequence numbers N003-N007 in FIG. 11 indicate those prepared in this step 93.

Upon completion of step 93, return is made to step 90 to prepare another NC program portion which is necessary for a drilling at the position P1 (FIG. 12(a)) which has been determined to be performed at a second machining step. Following the preparation of this program portion, further NC program portions are successively prepared for drillings at the positions P2-P4, and finally, an NC program portion for the fine boring is prepared. The NC program portion for the fine boring is composed of data blocks indicated by sequence numbers N031-N034 shown in FIG. 11.

Figure 7:
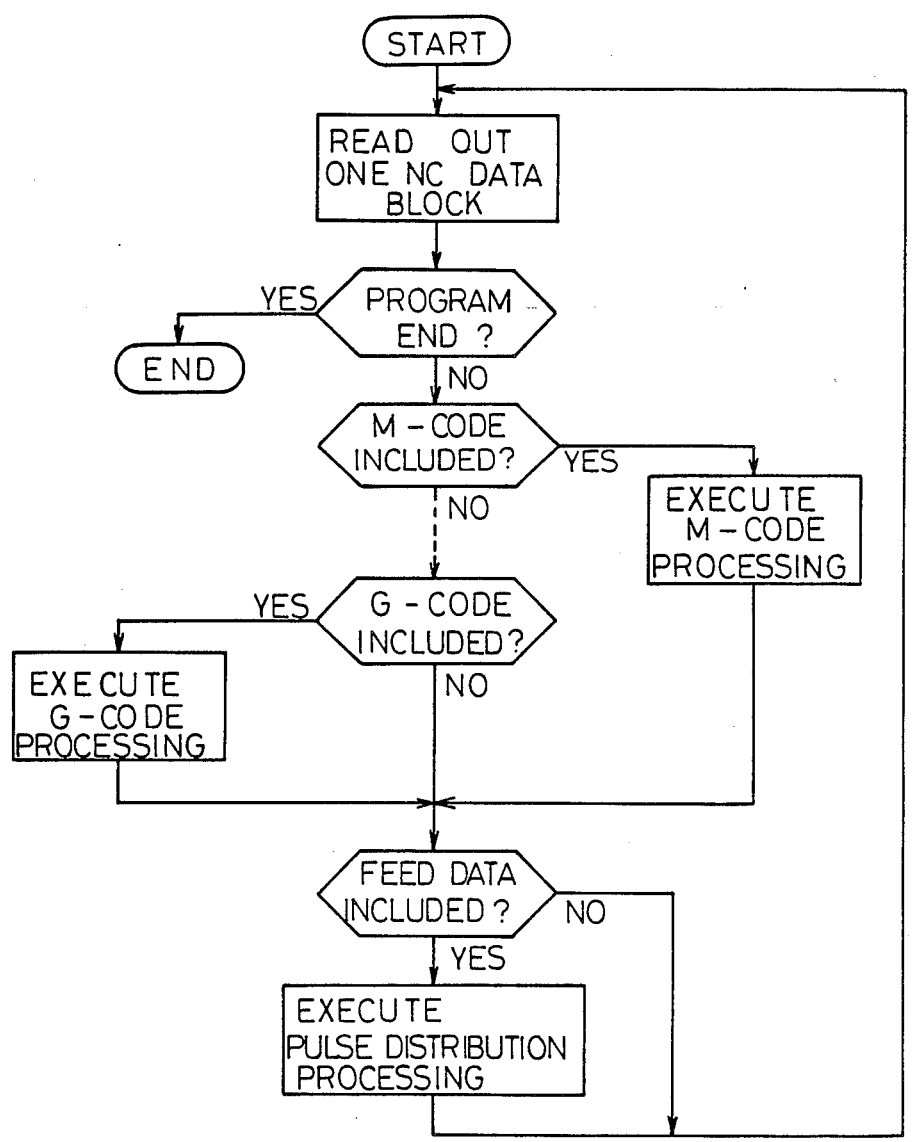
FIG. 7 is a specific flow chart of a numerical control execution routine which the microprocessor 10a executes to numerically control the machine tool in accordance with the prepared numerical control program.

The preparation of an NC program based upon machining information which has been input in an interactive mode is completed in this manner, and the MPU 10a is then brought into a stand-by state. When a machining start command is given thereafter, the MPU 10a is operated in accordance with the system control program shown in FIG. 7, whereby the prepared NC program data blocks are successively executed on a block-by-block basis. Consequently, the fine boring which requires a high accuracy is performed lastly, whereby the bore Ha can be precisely machined without being affected by other machinings performed on the same workpiece W. The operations of the MPU 10a and other related devices in accordance with the system control program shown in FIG. 7 are fully described in the above-noted U.S. patent, and therefore, further details of such operations are omitted herein for the sake of brevity.

A second embodiment of the present invention will be described with reference to FIGS. 13, 14(a) and 14(b). In this second embodiment, when step 62 in FIG. 3 is executed, a screen image shown in FIG. 13 is displayed on the CRT display unit 12 in place of that shown in FIG. 8(c). That is, roundness of the bore Ha is taken as the required machining accuracy. Symbols "○=0.024 mm", "○=0.09 mm", and "○=0.003 mm" in FIG. 13 respectively represent required ranks of roundness. Assuming now that the boring bore Ha needs the highest accuracy of roundness as shown FIG. 14(a), the operator depresses the 3-imprinted numeric key in response to a message in the screen image shown in FIG. 13. Consequently, when the routine shown in FIG. 5 is executed thereafter, the machining order numbers 1-6 are determined to perform the fine boring at the last machining step, as in the case of the first embodiment.

In the above-described embodiments, the NC program is prepared to use different tools for the rough and fine boring steps. Also where rough and finish machinings on a part of a workpiece W which needs a high finish accuracy are performed by the same tool such as milling cutter or end milling cutter, an NC program therefor is prepared to perform the finish machining at the last machining step.

Although in the above-described embodiments, the automatic programming apparatus according to the present inventions is described as that incorporated in the numerical controller, it may be constructed as a stand-alon system which is independent of the numerical controller.

Obviously, numerous modifications and variations of the present invention are possible in light of the above teachings. It is therefore to be understood that within the scope of the appended claims, the present invention may be practiced otherwise than as specifically described herein.

What is claimed is:

1. An automatic programming system for automatically programming a numerical control program used in successively machining a plurality of machining portions on a workpiece, based upon machining information input for said machining portions, said programming system comprising:

data input means for inputting, in addition to said machining information, accuracy data assigned to at least one machining portion which requires a higher machining accuracy than others of said machining portions;

data storage means for storing said machining information and said accuracy data input by said data input means;

machining order determination means for determining the machining order of said machining portions so that any machining portion needing a higher machining accuracy is machined later than any other machining portion needing a lower machining accuracy, by reference to said accuracy data stored in the data storage means; and program preparation means for preparing a numerical control program used in successively machining said workpiece portions in said machining order determined by said order determination means, based on said machining information stored in the data storage means.

2. An automatic programming system as set forth in claim 1, wherein:

said accuracy data represents a surface roughness of the finished surface of a machining portion to which said accuracy data is designated.

3. An automatic programming system as set forth in claim 1, wherein:

said accuracy data represents a roundness which any bore constituting one of said machining portions is to have after being finished.

4. An automatic programming system as set forth in claim 1, wherein said data storage means includes:

a first data table for storing data relating to the kinds of tools used in machining said workpiece, dimensions of each of said tools, positions at each of which a machining is to be effected, and a required accuracy; and a second data table for storing plural blocks of machining step data each including the kind and shape of each tool, a position where a machining is to be effected, the required accuracy and a machining order; and wherein said machining order determination means includes:

means for rearranging said plural blocks of machining step data in said second data table in the order in which machinings are to be effected.

* * * * *